United States Patent [19]
Coombes et al.

[11] 4,271,520
[45] Jun. 2, 1981

[54] SYNCHRONIZING TECHNIQUE FOR AN ERROR CORRECTING DIGITAL TRANSMISSION SYSTEM

[75] Inventors: Daniel J. Coombes, Winfield, Ill.; John H. Sangster, Short Hills, N.J.

[73] Assignee: Motorola, Inc., Schaumburg, Ill.

[21] Appl. No.: 51,938

[22] Filed: Jun. 25, 1979

[51] Int. Cl.³ .......................... G06F 11/10; H04L 7/02
[52] U.S. Cl. .......................................... 371/42; 371/5; 371/47; 375/114
[58] Field of Search .............. 371/5, 42, 47; 375/106, 375/108, 114

[56] References Cited
U.S. PATENT DOCUMENTS

| 3,466,601 | 9/1969 | Tong | 371/42 |
| 3,550,082 | 12/1970 | Tong | 371/42 |
| 3,571,794 | 3/1971 | Tong | 371/42 |
| 3,733,585 | 5/1973 | Merlo | 371/5 |
| 3,824,548 | 7/1974 | Sullivan et al. | 371/5 |

FOREIGN PATENT DOCUMENTS 2741760  3/1979  Fed. Rep. of Germany ............ 371/42

OTHER PUBLICATIONS

Peterson and Weldon, Error-Codes, Second Edition, MIT Press, 1972, pp. 374-376.

*Primary Examiner*—Charles E. Atkinson
*Attorney, Agent, or Firm*—James A. Scheer; James W. Gillman

[57] ABSTRACT

The instant invention resides in a system, including an encoder and a decoder, for the transmission and retrieval of digital data over a transmission medium. The encoder includes an error correction encoding scheme which processes the data and produces an encoded bit stream including data and parity bits in either an interspersed or blocked relationship. A transmission bit stream is generated by modulo-2 adding the encoded bit stream with a predetermined sync sequence, which sync sequence is selected to provide optimum sync detection at the decoder site.

The encoder modulo-2 subtracts said sync sequence from the received transmission stream, thereby producing a resultant which is monitored by an error correction detector. The detector produces an in- or out-of-synchronization indication as determined by the number of resultant bit stream detected errors.

8 Claims, 2 Drawing Figures

SYNCHRONIZING TECHNIQUE FOR AN ERROR CORRECTING DIGITAL TRANSMISSION SYSTEM

BACKGROUND OF THE INVENTION

This invention relates to the digital communication art and, more particularly, to a means of, and method for resolving synchronization in an error correction encoded transmission.

Digitally encoded communication systems are well known in the data transmission art. In such systems, a data bit stream containing digitally encoded information is to be transmitted over a noisy transmission medium. If the raw information data were transmitted without being processed, there would exist a substantial probability that portions of the message would be lost due to interference from the noisy medium. Therefore, this data is normally processed to produce a transmission bit stream which, after decoding at the receiver site, provides a means to correct or minimize transmission medium induced errors. Two examples of error correction processing schemes are block and convolutional type codes.

Proper decoding of the transmission bit stream requires that the decoder be able to recognize and synchronize with a received bit stream signal. One method known to the prior art for assuring proper decoding synchronization is the use of a predetermined set of sync bits which are sent immediately prior to the information data bits. The sync bits follow a predetermined pattern, such as one of the well known Barker sequences, which optimizes the ability of the decoder to recognize and synchronize with the transmission bit stream.

A problem with the aforementioned prior art synchronization schemes is that the transmission bit stream has a minimum length equal to the number of information plus sync bits. In some systems, the number of sync bits must be substantial with respect to the number of data bits to insure the desired probability of synchronization whereby the overall message length is quite long, thus requiring a lengthy transmission time. It is, of course, desirable to reduce transmission time to an absolute minimum.

In one approach which minimizes transmission bit length, the error correction encoded data is modulo-2 added with a polynomial generated from a binary word generator. The polynomial is selected based on the nature of the correctable error encoding scheme being employed. In so doing, processing circuitry at the decoder may determine from the recovered data bit error pattern the condition of either a loss of synchronization or channel induced errors. However, a fundamental problem with this system is that the polynomial is strictly a function of the particular coding scheme being used and, thus, must be suitably updated each time a different code is employed. In addition, this scheme necessarily employs a tradeoff between the ability to detect synchronization and the ability to distinguish synchronization from medium induced errors. Thus, the system does not provide optimized means for determining the state of synchronization.

In an alternate approach, a parity bit is added at the end of each transmitted word. A parity monitor at the decoding site detects the condition of disparity. An occasional departure from a parity constraint is allowed, however a grouping which repeatedly produces a condition of disparity is used to indicate an error in synchronization. A fundamental problem with this approach is that, for many applications, the system does not indicate the out-of-sychronization condition quickly enough, nor with high enough probability to render its performance acceptable.

SUMMARY OF THE INVENTION

It is an object of this invention, therefore, to provide an improved digital communication system which minimizes the number of required transmission bits while optimizing the ability of the decoder to determine the state of synchronization.

Briefly, according to the invention, an encoder, for use in a digital communication system, is comprised of an error correction encoder which processes a data bit stream and produces an error correctable encoded bit stream corresponding thereto. An encoder storage stores a predetermined sequence of sync bits, which sync bit sequence is selected to optimize, at the decoder site, detection of sync condition. An encoder combiner, preferably of the modulo-2 type, combines the encoded bit stream with the sync bit sequence thereby producing a transmission bit stream. A decoder processes a transmission bit stream and comprises a decoder storage which has the predetermined sync bit sequence stored therein. A decoder combiner, also preferably of the modulo-2 type, combines the transmission bit stream with a sync bit sequence thereby regenerating, for the condition of the decoder being in synchronization with the transmission bit stream, the error correctable encoded bit stream. An error correction detector monitors the output of the decoder combiner and produces a first output, indicative of the decoder being in synchronization with the transmission bit stream, in response to the number of detected errors being less than a predetermined value and produces a second output, indicative of the decoder being out of synchronization with the transmission bit stream, in response to the number of detected errors being greater than or equal to the predetermined value.

Preferably, the data bit stream is comprised of a total of N bits, whereas the error correction encoder produces an encoded bit stream comprised of a total of N+K bits, where K equals the number of generated parity bits. The sync bit sequence is comprised of a total of N+K bits whereby, for the preferred embodiment of bit by bit modulo-2 addition of encoded bits with sync bits, the transmission bit stream is comprised of a total of N+K bits. This overall length is less than that in the prior art which would prefix such N+K bits with a given number of sync bits.

DETAILED DESCRIPTION OF THE PREFERRED EMBODIMENT OF THE INVENTION

Figure 1:
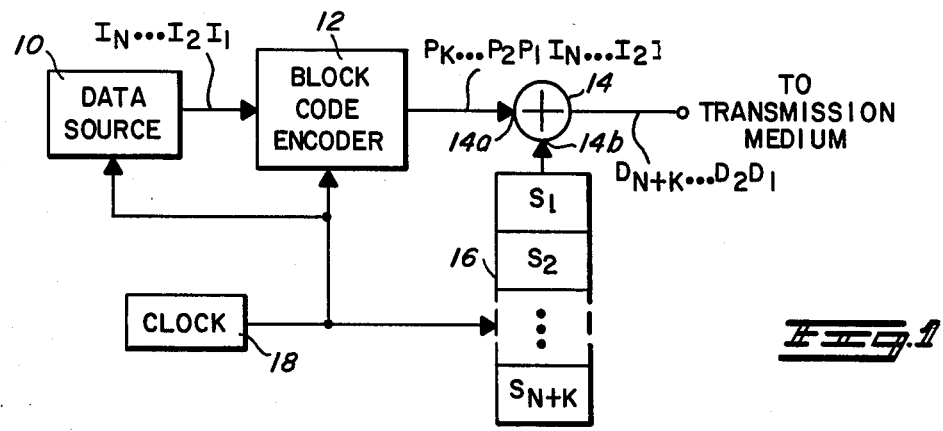
FIG. 1 is a block diagram illustrating a preferred embodiment of an encoder according to the invention.

Referring to FIG. 1, a series of N data bits, $I_1 I_2 \ldots I_N$, are shown being supplied from a data source 10. Data source 10 may be comprised of any conventional source of data bits, such as a user keyboard, computer output and so forth.

The N data bits are passed to a conventional block code encoder 12. Block code encoder 12 is of conventional design and is, preferably, of the type discussed in Shu Lin, "An Introduction to Error Correcting Codes", Prentice Hall, 1970, pp 70–75. In operation, block code encoder 12 processes the N data bits and produces an output error correctable encoded bit stream which, in this the preferred embodiment of the invention, is comprised of the N data bits followed by K parity bits. As is well known in this art, the parity bits provides a means to correct for errors occurring during transmission of the data.

The encoded bit stream appearing at the output of block code encoder 12 is applied to one input 14a of a conventional modulo-2 adder 14.

Applied to the remaining input 14b of modulo-2 adder 14 is the output from a sync bit register 16. Sync register 16 is comprised of N+K stages. Stored within encoder sync storage 16 is a predetermined sync sequence chosen to optimize the ability of the decoder site to detect synchronization condition. For example, the sync storage register 16 might store any one of the Barker sequences for suitable values of N+K. Upon activation by a conventional clock 18, the encoded bit stream and sequence, as stored in sync register 16, are modulo-2 added by modulo-2 adder 14 on a bit by bit basis, thereby providing a transmission bit stream $D_1D_2 \ldots D_{N+K}$, where $D_1 = I_1 \oplus S_1$,
$D_2 = I_2 \oplus S_2 \ldots D_{N+K} = P_K \oplus S_{N+K}$.

Figure 2:
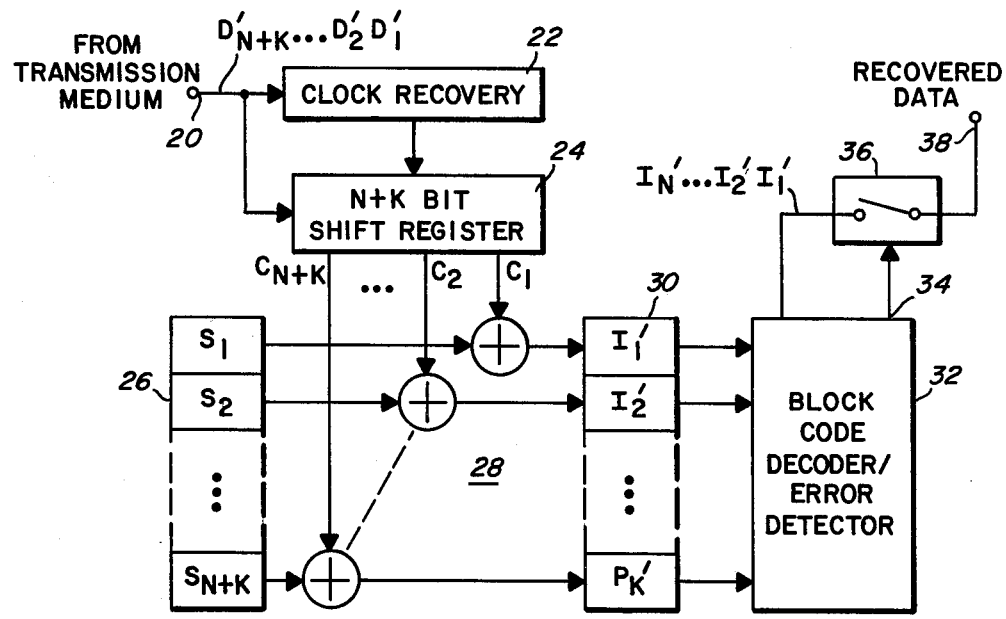
FIG. 2 is a block diagram illustrating the preferred embodiment of a decoder according to the invention.

The transmission bit stream is then passed over a transmission medium, such as radio waves or telephone lines, whereby it is received and processed in the preferred decoder, shown in FIG. 2. Here, the transmission bit stream, which may or may not be identical to the transmission bit stream sent by the encoder of FIG. 1, as indicated by primes, is received at a decoder input 20. The recovered transmission bit stream is fed both to a clock recovery circuit 22 and an N+K length shift register 24. Clock recovery circuit 22 is of conventional design and recovers the clock signal, such as is produced by clock 18 of FIG. 1, from the received transmission bit stream. This recovered clock signal is then passed to the N+K bit shift register 24 causing said register to load the received transmission bit stream at the proper clock rate.

Also provided at the decoder is a decoder sync bit register 26. The decoder sync bit register parallels the encoder sync bit register 16 (FIG. 1) in that it contains N+K stages having the aforementioned predetermined sync sequence stored therein.

Each output, $C_1 \ldots C_{N+K}$ from the N+K bit shift register 24 is applied to a corresponding one of the N+K modulo-2 adders, indicated generally at 28. Fed to the remaining input of each of the modulo-2 adders 28 is a corresponding one of the sync bits stored in sync bit register 26. It should be understood that modulo-2 addition is the same as modulo-2 subtraction, so that the output from the modulo-2 adders 28 is equal to the modulo-2 difference between a received transmission bit stream and the stored sync sequence. These results are stored in a N+K length register 30. Thus, it should be obvious that, for the condition wherein the decoder is in synchronization with the transmission bit stream, the contents of the storage 30 will be precisely the encoded bit stream produced at the output of the block code encoder 12 of FIG. 1.

The output of storage 30 is constantly monitored by a block code decoder/error detector 32. Block code decoder/error detector 32 is of conventional design, and is capable of determining the number of errors in an information plus parity encoded bit stream. In this, the preferred embodiment of the invention, the block code decoder/error detector 32 is more thoroughly discussed in the above identified Shu Lin textbook, at page 80.

Since the sync sequence utilized at the encoder and subsequently at the decoder is of the type which optimizes the ability to detect synchronization conditions, the block code decoder/error detector 32 will detect a large number of errors for all conditions except that in which the stored register 30 contains the encoded bit stream appearing at the output of block code encoder 12 of FIG. 1. Provided within block code decoder/error detector 32 is a threshold level such that for the condition of the number of detected errors being less than a threshold level, an error detector output 34 is activated which, in turn, closes the contacts of switch 36 to thereby route the error corrected recovered data bit stream $I_1 \ldots I_N$ to the recovered data output 38. For all other conditions wherein the number of errors detected by error detector 32 is equal to, or greater than this preset limit, the output 34 is not activated and switch 36 is open.

In summary, the instant invention provides a means to minimize the required length of a transmission bit stream by eliminating the addition of individual sync bits at the beginning of the stream while, on the other hand, providing a means to optimize the ability of the decoder to sense the sync condition by combining a predetermined sync sequence with the encoded bit stream.

While preferred embodiments of the invention have been described in detail, it should be apparent that many modifications and variations thereto are possible, all of which fall within the true spirit and scope of the invention.

We claim:

1. In a digital communication system for the transmission and reception of a data bit stream, the improvement comprising:

an encoder for processing said data bit stream, said encoder comprising:

error correction encoder means for receiving said data bit stream and producing an error correctable encoded bit stream corresponding thereto;

encoder storage means having a predetermined sequence of sync bits stored therein, said sync bit sequence being selected to optimize, at the decoder site, detection of an out of sync condition; and encoder combining means for predeterminedly combining said encoded bit stream with said sync bit sequence to thereby produce a transmission bit stream; and a decoder for processing said transmission bit stream comprising:

decoder storage means having said predetermined sync bit sequence stored therein;

decoder combining means for predeterminedly combining said transmission bit stream with said sync bit sequence thereby regenerating, for the condition of the decoder being in synchronization with said transmission bit stream, said error correctable encoded bit stream;

data storage means, coupled to the decoder combining means, for storing the regenerated error correctable encoded bit stream;

error correction detector means, coupled to the data storage means, for monitoring the contents of the data storage means, thereby monitoring the output of said decoder combining means, and producing a first output, indicative of the decoder being in synchronization with said transmission bit stream, in response to the number of detected errors being less than a predetermined value and producing a second output, indicative of the decoder being out of synchronization with said transmission bit stream, in response to the number of detected errors being greater than or equal to said predetermined value.

2. The improvement of claim 1, wherein said encoder combining means and said decoder combining means are comprised of modulo-2 adder means.

3. The improvement of claim 1 wherein the data bit stream is comprised of a total of N bits; said error correction encoder produces an encoded bit stream comprised of a total of N+K bits; said sync bit sequence is comprised of a total of N+K bits and said transmission bit stream is comprised of a total of N+K bits, where N and K are predetermined integers.

4. The improvement of claim 2 wherein the data bit stream is comprised of a total of N bits; said error correction encoder produces an encoded bit stream comprised of a total of N+K bits; said sync bit sequence is comprised of a total of N+K bits and said transmission bit stream is comprised of a total of N+K bits, where N and K are predetermined integers.

5. A method for resolving the state of synchronization in an error correction, digital transmission system comprising the steps of encoding a data bit stream by:
  (a) error correction encoding said data bit stream thereby producing an encoded bit stream;
  (b) providing a predetermined sync bit sequence, said sync bit sequence being selected to optimize detection of an out of sync condition at a decoder site;
  (c) predeterminedly combining said encoded bit stream with said sync bit sequence thereby producing a transmission bit stream;

and decoding said transmission bit stream by:
  (d) providing said predetermined sync bit sequence;
  (e) predeterminedly combining said transmission bit stream with said sync bit sequence such that for the condition of the decoding operation being in synchronization with said transmission bit stream said encoded bit stream is regenerated;
  (f) error correction detecting the resultant of step (e) to determine the number of errors occurring therein; and
  (g) indicating an in-synchronization condition corresponding to the number of errors detected in step (f) being less than a predetermined maximum number.

6. The method of claim 5 wherein step (c) comprises the step of:
  modulo-2 adding said encoded bit stream to said sync bit sequence in a bit by bit order;
  and wherein step (e) comprises the step of:
  modulo-2 substracting said sync bit sequence from said transmission bit stream.

7. The method of claim 5 wherein said data bit stream is comprised of a total of N bits and wherein:
  step (a) comprises the step of encoding said N bit data bit stream and producing an encoded bit stream comprised of a total of N+K bits;
  steps (b) and (d) comprise providing a total of N+K sync bits; and
  step (c) comprises the step of combining said N+K bit encoded bit stream with said N+K bit sync stream to produce a transmission bit stream having a total of N+K bits, where N and K are predetermined integers.

8. The method of claim 6 wherein said data bit stream is comprised of a total of N bits and wherein:
  step (a) comprises the step of encoding said N bit data bit stream and producing an encoded bit stream comprised of a total of N+K bits;
  steps (b) and (d) comprise the step of providing a total of N+K sync bits; and
  step (c) comprises the step of combining said N+K bit encoded bit stream with said N+K bit sync stream to produce a transmission bit stream having a total of N+K bits, where N and K are predetermined integers.

* * * * *